United States Patent [19]

Gregg

[11] Patent Number: 5,071,164

[45] Date of Patent: Dec. 10, 1991

[54] TRUCK TRAILER

[75] Inventor: John S. Gregg, Summerland, Canada

[73] Assignee: 501 Peerless Page Industries Ltd., Canada

[21] Appl. No.: 545,716

[22] Filed: Jun. 29, 1990

[30] Foreign Application Priority Data

Jul. 11, 1989 [CA] Canada .................................. 605326

[51] Int. Cl.⁵ .............................................. B62D 21/04
[52] U.S. Cl. ...................................... 280/786; 280/789
[58] Field of Search ........................ 280/787, 786, 789

[56] References Cited

U.S. PATENT DOCUMENTS 2,900,069  8/1959  Manns et al. ......................... 280/786
4,221,395  9/1980  Carte .................................... 280/786

FOREIGN PATENT DOCUMENTS 912420  4/1954  Fed. Rep. of Germany ...... 280/786
875158  9/1942  France ................................ 280/786

Primary Examiner—Kenneth R. Rice

Attorney, Agent, or Firm—Shlesinger, Arkwright Garvey

[57] ABSTRACT

The invention provides a chassis for a truck trailer which can be manufactured for less cost, and can be lighter, for the same strength, as a conventional twin I-beam trailer as used in fifth wheel logging truck applications. The chassis of the invention has an elongated beam member having a generally horizontal top wall, a pair of laterally spaced apart side wall portions with upper margin portions which are inclined inwardly and upwardly to merge continuously with the top wall portion. Lower margin portions of the side wall portions have flanges which have inner edges spaced apart to accommodate service conduits, and other components. A plurality of transversely extending bunk means are spaced apart longitudinally along the beam member at respective stations. The inwards inclination of the upper margin portions reduces chances of a loading grapple fouling with edges of the beam member when loading and unloading logs from the trailer. Furthermore, the service conduits and other components are protected from accidental damage during loading.

31 Claims, 3 Drawing Sheets

TRUCK TRAILER

BACKGROUND OF THE INVENTION

The invention provides a chassis for a truck trailer which is particularly adapted for use with a fifth wheel tractor/semi-trailer combination as used for hauling logs.

Prior art logging semi-trailers commonly have a chassis fabricated from a pair of I-beam members spaced apart laterally, and extending between front and rear portions of the trailer. A plurality of transversely extending bunks are spaced apart longitudinally along the twin I-beams at respective stations to support the load thereon. The bunks are cut to provide a T-shaped clearance opening for each I-beam to pass through, and are secured at the required station of the I-beams by welding, while leaving an upper flange portion of the bunk intact. Service conduits, for example electrical and pneumatic conduits, are usually passed along an inner surface of an I-beam, and secured thereto using clips. This is to prevent inadvertent damage from the load, or from a grapple which is commonly used for positioning the load on the trailer, or for removing the load from the trailer. During loading, it is not unusual for the arms of the grapple to interfere with flanges of the beams, particularly the outwardly extending upper flanges. This interference is time consuming and can damage the load, the beam or the grapple itself. In some instances, swinging of the grapple arms relative to the I-beams can damage the service conduits passing along the I-beams, or can damage other components secured to the I-beams. The grapple is prone to snagging or jamming on flanges of the I-beams, thus preventing withdrawl of the grapple. On some trailers, grapple deflectors are secured to the I-beams to deflect the grapple, but this increases cost and weight of the trailer.

From the above, it can be seen that the prior art logging semi-trailer is time consuming to construct, and can be inconvenient when loading and unloading logs using a grapple.

SUMMARY OF THE INVENTION

The invention reduces the difficulties and disadvantages of the prior art by providing a truck trailer chassis which does not have outwardly extending flanges adjacent an upper portion of the beam which would otherwise tend to interfere with the loading grapple. The present trailer can be made using less labour than the prior art trailer, and has an improved strength-to-weight ratio. Furthermore, the twin I-beams of the prior art trailer have been eliminated, and a relatively smoothly-contoured, preferably one-piece elongated beam member substituted.

A truck trailer chassis according to the invention comprises an elongated beam member having a top wall portion and a pair of laterally spaced apart side wall portions. The side wall portions have respective upper margin portions which are inclined inwardly and upwardly to merge continuously with the top wall portion. The side wall portions have respective lower margin portions which have respective flanges to increase strength of the side wall portions. The flanges have inner edges which are spaced apart to provide a longitudinal gap therebetween. The chassis also includes a plurality of transversely extending bunk means spaced apart longitudinally along the beam member at respective stations.

A detailed disclosure following, related to drawings, describes a preferred embodiment of the invention which is capable of expression in structure other than that particularly described and illustrated.

DESCRIPTION OF THE PREFERRED EMBODIMENT(S)

Figure 1:
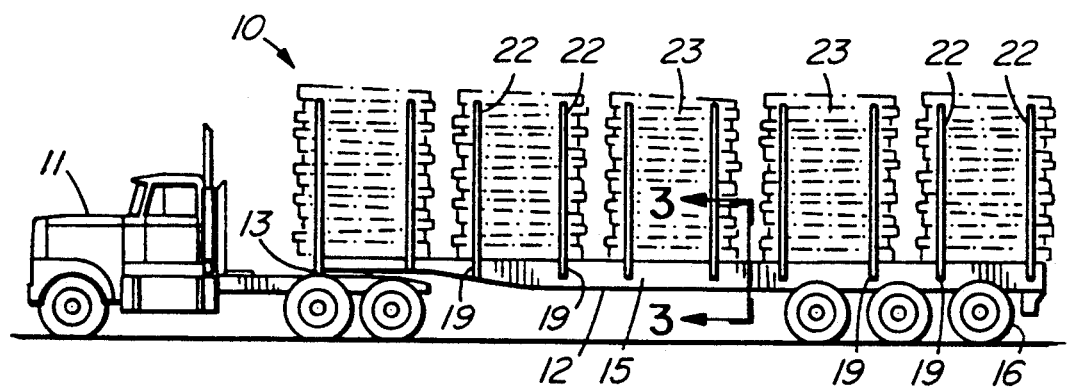
FIG. 1 is a simplified side elevation of a tractor/fifth wheel semi-trailer combination shown carrying a load.
Figure 2:
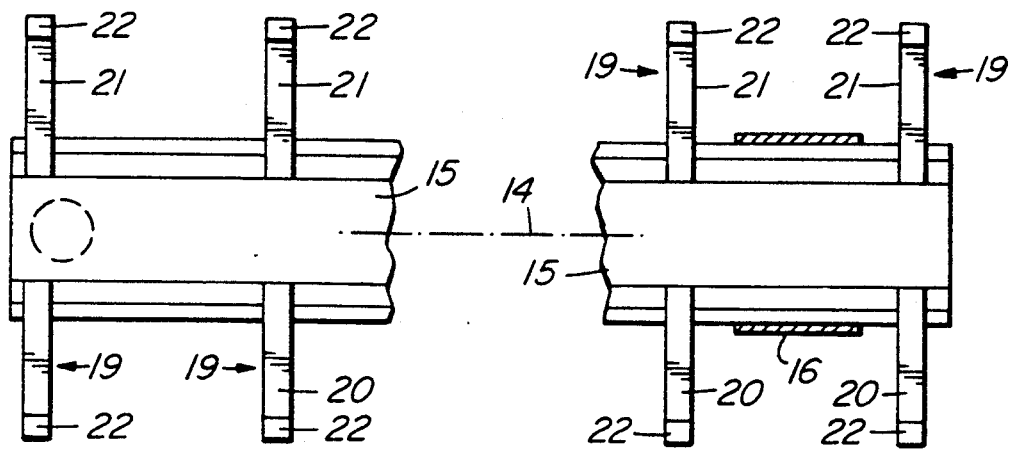
FIG. 2 is a simplified fragmented top plan of the trailer, some other portions of the trailer and the load being removed for clarity.
Figure 3:
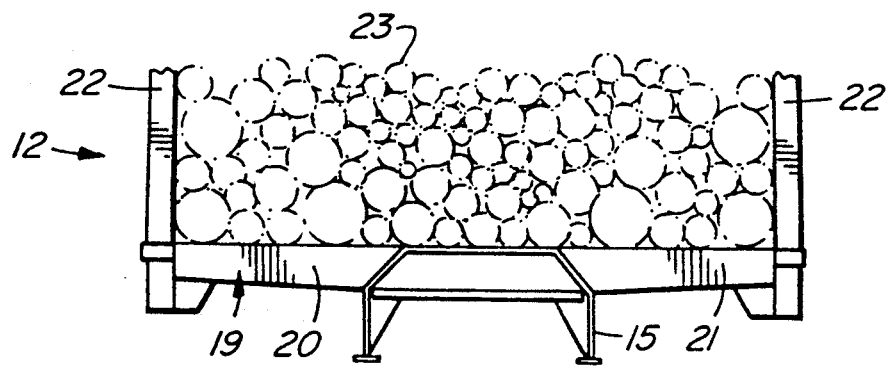
FIG. 3 is a simplified fragmented transverse cross section on line 3—3 of FIG. 1.

FIGS. 1 through 3

A tractor/fifth wheel semi-trailer combination 10 has a tractor unit 11, and a fifth wheel trailer 12 connected thereto through a king pin of a fifth wheel connection assembly 13 at a forward end of the trailer. The trailer 12 has an elongated beam member 15 spaced symmetrically about a central longitudinal axis 14, and has a rear end supported by a rear wheel bogie 16. The trailer has a plurality of transversely extending bunk means 19 spaced apart longitudinally along the beam member at respective stations. The bunk means have oppositely extending wing sections 20 and 21 and stakes 22 extending upwardly from outer ends of the wing sections to support a load 23 of logs on the trailer. While the trailer is shown carrying relatively short logs, for example approximately 3 meter stud length logs, clearly, longer logs, or other elongated loads could be supported on the trailer. In addition, other loads, such as standard goods containers, that is shipping containers, could be carried on the trailer, but this would require some modifications to the bunk means 19, for example provision of standard container couplings.

FIGS. 4 through 7

Figure 5:
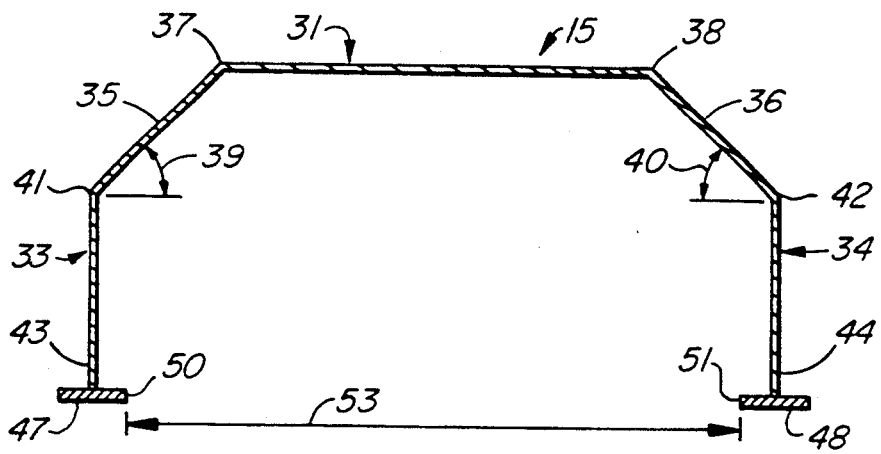
FIG. 5 is a simplified cross-section through a beam member only of the chassis not other components being shown.

As best seen in FIG. 5, the beam member 15 has a horizontal top wall portion 31, and a pair of laterally spaced apart vertical side wall portions 33 and 34 respectively. The portions 33 and 34 have upper margin portions 35 and 36 respectively which are inclined inwardly and upwardly to merge smoothly and continuously with the top wall portion 31 across radiused upper boundaries 37 and 38 between the top wall and upper margin portions. The upper margin portions 35 and 36 are inclined at equal angles 39 and 40 respectively to the horizontal and also merge smoothly and continuously with the respective side wall portion across radiused lower boundaries 41 and 42. Preferably, the top wall portion 31, the side wall portions 33 and 34 and the upper margin portions 35 and 36 are fabricated from a single sheet of material, for example, by forming, so as to provide a unitary beam member with smoothly radiused boundaries, and constructed with reduced labour costs, and elimination of much welding as found in the prior art. It can be seen that the upper margin portions of the side wall portions are obliquely inclined, flat, elongated sheet portions which extend smoothly between the vertical portions of the side wall and the horizontal portion of the top wall of the beam member, and are separated therefrom by the lower and upper boundaries respectively.

The side wall portions 33 and 34 have respective lower margin portions 43 and 44 which are provided with horizontal flanges 47 and 48 respectively. The flanges 47 and 48 are parallel-sided elongated strips which are secured at central portions thereof to downwardly facing lower edges of the lower margin portions 43 and 44 to increase the vertical section modulus of the beam. The flanges 47 and 48 have inner edges 50 and 51 respectively which are spaced apart by a transverse spacing 53 to provide a longitudinal gap therebetween to receive service conduits, shown in broken outline at 55, which pass along inside walls of the chassis and are secured thereto. It can be seen that the conduits and other components such as air reservoir, valves and brake chambers, etc. can be located within an interior of the beam member, e.g. on the inside surfaces of the beam member, and thus are protected from damage from the load, or the grapple when loading or unloading the trailer.

Figure 6:
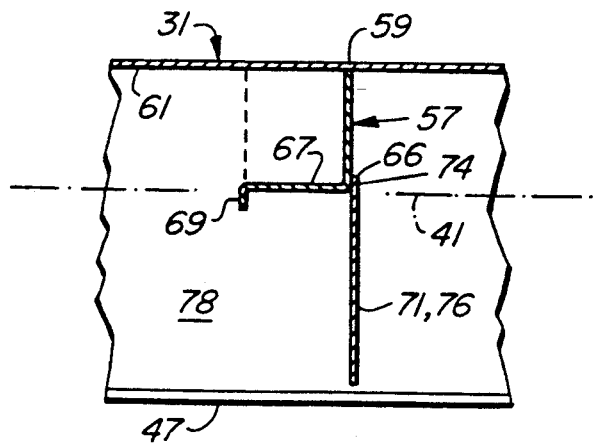
FIG. 6 is a simplified fragmented longitudinal section of the chassis, as would be seen from line 6—6 of FIG. 4.

The chassis further includes a plurality of generally similar bulkhead members spaced apart longitudinally along the beam member at respective stations which coincide with the stations of the bunks 19 (FIGS. 1 and 2) and one such bulkhead cross member is designated 57 and is described with reference to FIGS. 4 and 6 as follows. The member 57 has an upper edge portion 59 secured to a lower surface 61 of the top wall 31 of the beam member. The member 57 also has laterally spaced apart side edge portions 63 and 64 which are cut obliquely as shown to facilitate securing to the obliquely inclined upper margin portions 35 and 36 of the side wall portions 33 and 34 respectively. The cross member 57 has a lower portion 66 which has a generally horizontally extending flange 67 extending longitudinally of the chassis from the lower portion 66 at a position coincident with the lower boundaries 41 and 42. The flange has a downwardly extending margin portion 69 so that the bulkhead cross member 57 has a generally Z-shaped section as seen in FIG. 6.

Figure 4:
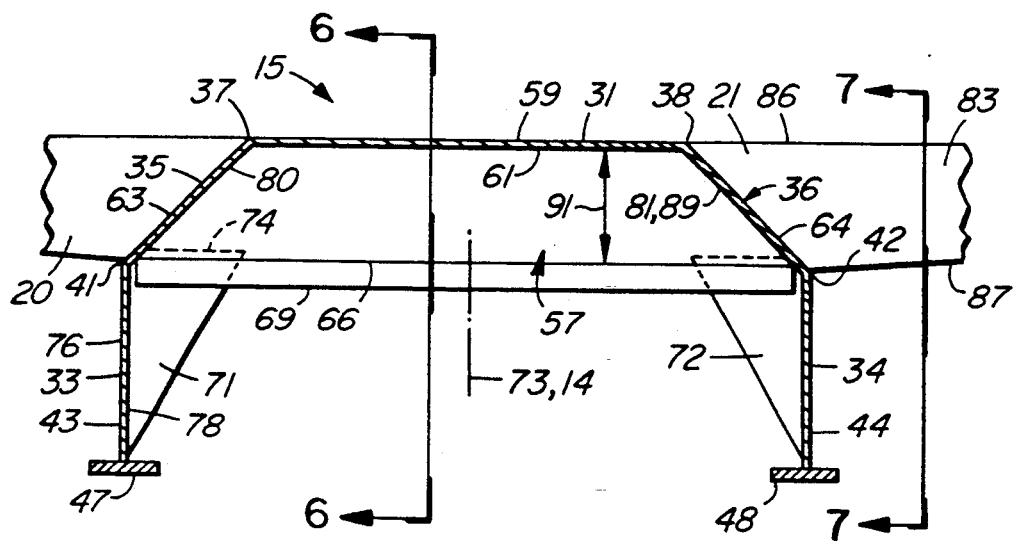
FIG. 4 is a simplified fragmented transverse section, generally similar to FIG. 3, but at an enlarged scale with some portions removed for clarity.

The chassis further includes a plurality of generally triangular gusset members spaced apart longitudinally along the beam members at stations coincident with the respective bulkhead cross members, a pair of such gasset members being shown and designated 71 and 72 in FIG. 4. The gusset members are essentially similar in shape, and arranged so as to be mirror images of each other about a vertical plane 73 containing the central axis 14 of the beam member, and consequently only the gusset member 71 will be described. The member 71 has a top edge portion 74 secured to the bulkhead cross member 57 adjacent the lower portion 66 thereof, for example by welding, and thus is essentially integral therewith. The gusset member 71 has a side edge portion 76 similarly secured to an inner face 78 of the side wall 33 of the beam member. Clearly, the gusset members 71 and 72 and the associated bulkhead cross members 57 serve as internal transverse stiffening means to increase stiffness of the overall cross section of the beam member 15. The stiffening means are located closely adjacent the stations with the bunk means and serve to provide an increase in local stiffness of the beam member without need for external projections on the outer surfaces of the top wall 31 or the sidewalls 33 and 34. The lack of external projections on the outer surfaces results in a "clean" unobstructed body which is less prone to cause interference with load handling equipment such as grapples etc., when loading and unloading the truck trailer.

As seen in FIG. 4, the wing sections 20 and 21 of the bunk means 19 extend outwardly from the side walls of the beam members, the wing sections 20 and 21 having inner face portions 80 and 81 respectively secured to adjacent portions of the upper margin portions 35 and 36 respectively.

Figure 7:
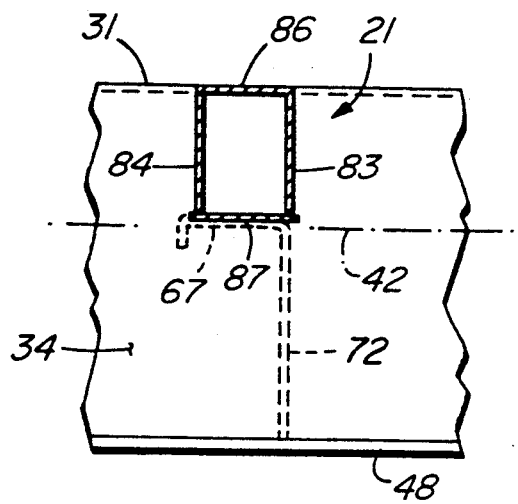
FIG. 7 is a simplified fragmented section of a bunk, as seen from line 7—7 of FIG. 4.

As best seen in FIGS. 4 and 7, the wing section 21 has a pair of longitudinally spaced apart wing side walls 83 and 84, which are generally vertical and of equal depth. The wing section 21 also has vertically spaced apart wing top and bottom walls 86 and 87 interconnecting edges of the wing side walls 83 and 84, so as to define a generally rectangular cross section. The wing top wall 86 is aligned with the top wall portion 31 of the beam member. The wing side wall 83 is aligned transversely with the bulkhead cross member 57, which is shown in broken outline in FIG. 7.

Referring again to FIG. 4, the inner face portion 81 of the wing section 21 has a total of four edges relating to the four walls of the wing section. One edge 89 of the wall 83 is shown and is inclined obliquely to the horizontal so as to coincide with the inclination of the respective upper margin portion 36 of the side wall 34, so as to facilitate securing thereto, for example by welding. The edge of the wall 84 is similarly inclined.

In FIG. 4, it can be seen that depth 91 of the wing member 21 adjacent the inner face portion 81 is equal to vertical depth of the upper margin portions 35 and 36 i.e. vertical space between the boundaries 38 and 42.

Referring again to FIG. 7, the wing bottom wall 87 is aligned transversely with the horizontally extending flange 67 of the bulkhead cross member 57. It can be seen that the bulkhead cross member provides internal support for the upper margin portion 36 against loads from the inner face portion 81 of the wing side wall 83, and the wing bottom wall 87.

ALTERNATIVES

FIG. 8

An alternative elongated beam member 95 can be used as a substitute for the beam member 15 of FIG. 1. The member 95 has a generally horizontal top wall portion 97, and a pair of laterally spaced apart generally vertical side wall portions 99 and 100. The side wall portions have respective upper margin portions 102 and 103 respectively which are inclined inwardly and upwardly to merge continuously with the top wall portion, through partially cylindrical arcs so that the top portion and side portions are essentially tangential thereto. Thus, the upper margin portion 102 is separated from the top wall and a side wall portions 97 and 99 by upper and lower boundaries 106 and 107 respectively.

Similarly, the upper margin portion 103 is separated from the adjacent top wall and side wall portion by upper and lower boundaries 109 and 110.

The side wall portions 99 and 100 have respective lower margins 112 and 113 which have respective inwardly facing flanges 116 and 117. The flanges are smoothly connected to the lower margins 112 and 113 through radiused corners so as to eliminate any outwardly projecting edges, thus reducing the chance of interference with the loading grapple. Similar to the previous embodiment, the flanges have inner edges 118 and 119 which are spaced apart to provide a longitudinal gap therebetween to receive the service conduits passing along the chassis.

Figure 8:
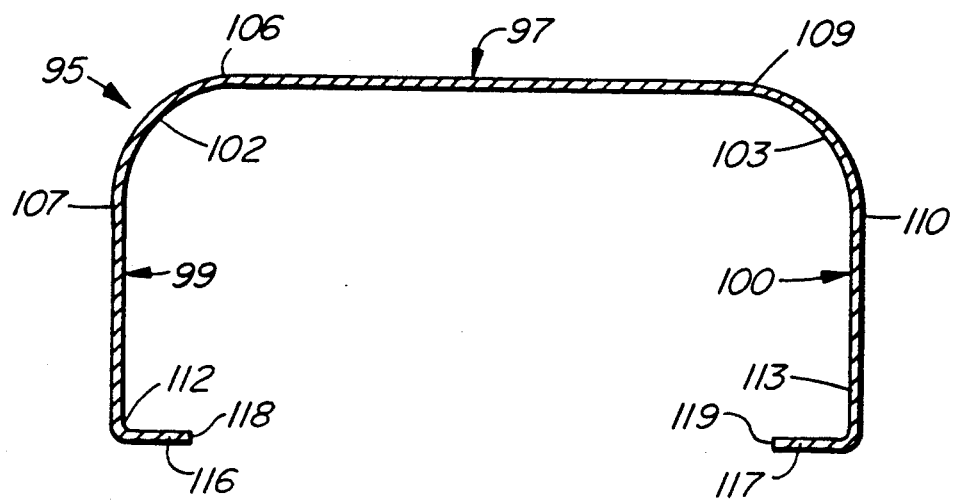
FIG. 8 is a simplified cross-section through an alternative beam member only, not other components being shown.

It can be seen that the alternative beam member 95 differs from the beam member 15 by having cylindrically curved upper margin portions of the side walls, as opposed to flat, obliquely inclined or mitered corners. Also the alternative beam member 95 has only inwardly facing flanges at the lower portions of the side walls and thus outer portions of the lower margins are free of obstructions that are found in the beam 15. It can be seen that the alternative of FIG. 8 can be produced by a forming process, eliminating welding to fabricate the beam member itself. Clearly, the bulkhead cross members, cross member gussets and bunk wing sections similar to those described with reference to FIGS. 1 through 7, are welded to the alternative beam member 95.

In both embodiments, the prior art grapple deflectors which are commonly secured to the I-beams are not required. Also, beam members of this general type provide additional advantages, for example they provide a cover the king pin of the fifth wheel connector 13, shown diagrammatically in FIGS. 1 and 2.

Clearly, the beam members could be incorporated in other trailers, such as full trailers with a front dolly or bogey, flat bed trailers, etc. In these alternative trailers, alternative means for supporting the front portion of the trailer would be substituted for the fifth wheel coupling, etc., as is well known in the trade.

In both embodiments of the beam member, the upwardly and inwardly curved upper margin portions of the side wall portions provide advantages in addition to those previously discussed as follows.

If the upper margin portions of the beam member 15 or 95 had been upwards vertical continuations of the side wall portions, which intersected outward horizontal continuations of the horizontal top wall at opposite corners, a generally rectangular-sectioned open box beam, with relatively sharp upper corners level with an upper surface of the bunks would have resulted. The sharp corners would have tended to interfere with the grapples when loading and unloading the load, and would have similar disadvantages to the prior art twin I-beam structure.

Furthermore, if the beam were provided with relatively sharp upper corners, and inwardly facing flanges for lower portions to provide a beam with an open bottom, the neutral axis with respect to bending of the beam within a vertical plane, i.e. the neutral axis of the vertical section modulus would be considerably above a horizontal plane passing midway between the top wall portion and the lower flanges of the beam. This would be the result of the positioning of a relatively large cross-sectional area of material along the upper edges of the beam, with very little material adjacent the lower edges of the beam, and would result in excessively high tensile stresses in the lower flanges and lower margin portions of the side wall portions. By providing the said upwardly and inwardly extending upper margins, which can be either flat as in the beam member 15, or can be curved as in the beam member 95, material adjacent the upper edges of the beam is reduced and the neutral axis is lower than it would have been with a relatively square-sectioned open beam. This produces a corresponding reduction in tensile stresses in the lower margins of the side portions of the beam.

With either type of beam member, it can be seem that the beam member can be produced at relatively low unit cost by forming in a press, thus eliminating welding, high labour costs and risk of poor weld control, as well as providing a wrought structure with improved stress distribution at radiused edges of the portions of the beam member.

Because the top wall 31 (FIGS. 1 through 7) or 97 (FIG. 8) extends continuously between the respective sidewalls, the horizontal modulus of the cross section of either of these beams is higher than the corresponding horizontal modulus of the cross section of an equivalent prior art twin I-beam trailer. Thus the present trailer has a chassis which is considerably stiffer to resist lateral deflecting forces that can occur when cornering strongly than some prior art trailers which are sometimes fitted with additional stiffers, or heavier bunks to provide sufficient stiffness against this lateral force.

It is preferred that the lower face of the beam is open to provide the gap between flanges of the side walls for additional advantages as follows. Clearly, the open portion provides easy servicing access to install and service conduits passing along the inner surface of the beam member or other components. Furthermore, the open section of the beam has less torsional stiffness than a closed section, which is desirable for rough road usage as a less torsionally stiff beam provides a controlled torsional deflection between axles and fore and aft portions of the beam member, thus accommodation road undulations commonly found on logging roads.

In view of the above, it can be seen that the top wall portion can be "peaked" to reduce material adjacent the outer edges of the section. Furthermore, the side wall portions can be non-vertical, i.e. inclined upwardly and inwardly to maintain the neutral axis closely adjacent a mid-plane of the section. Almost any cross-sectional shape within the above parameters will provide some or all of the advantages of the present invention.

I claim:
1. A truck trailer chassis comprising:
  (a) an elongated beam member having a top wall portion and a pair of laterally spaced apart side wall portions, the side wall portions having respective upper margin portions which are inclined inwardly and upwardly to merge continuously with the top wall portion, the side wall portions having respective lower margin portions which have respective flanges to increase strength of the side wall portions, the flanges having inner edges which are spaced apart to provide a longitudinal gap therebetween, the longitudinal gap having a size to facilitate servicing of items located within an interior of the beam member,
  (b) a plurality of transversely extending bunk means spaced apart longitudinally along the beam member at respective stations,
  (c) internal transverse stiffening means for increasing stiffness of overall cross-section of the beam mem- ber, the stiffening means extending between at least two wall portions of the beam member and being spaced longitudinally apart at intervals along the beam member.

2. A truck trailer chassis as claimed in claim 1, in which:
   (a) the top wall portion has a horizontal portion and the side wall portions have respective vertical portions,
   (b) the upper margin portions of the side wall portions are obliquely inclined elongated sheet portions which extend smoothly between the vertical portions of the side wall and the horizontal portion of the top wall of the beam member.

3. A truck trailer chassis as claimed in claim 1, in which:
   (a) the top wall portion, the side wall portions and the upper margin portions of the side wall portions are fabricated from a single sheet of material,
   (b) the stiffening means are located adjacent at least some stations of the bunk members.

4. A truck trailer chassis as claimed in claim 2, in which the upper margin portions are inclined at angles of approximately 45 degrees to the horizontal.

5. A truck trailer chassis as claimed in claim 1, in which the stiffening means comprises:
   (a) a plurality of bulkhead cross members spaced apart longitudinally along the beam member at respective stations, each bulkhead cross member having an upper edge portion secured to a lower surface of the top wall of the beam member, and laterally spaced apart side edge portions secured to upper margin portions of the side walls of the beam member.

6. A truck trailer chassis as claimed in claim 5, the stiffening means further including:
   (a) a plurality of gusset members spaced apart longitudinally along the beam member at stations coincident with the respective bulkhead cross members, each gusset member having a top edge portion secured to the adjacent bulkhead cross member, and a side edge portion secured to an inner face of the side wall of the beam member.

7. A truck trailer chassis as claimed in claim 5, in which the bulkhead cross members have a lower portion which has a generally horizontally extending flange extending longitudinally of the chassis therefrom.

8. A truck trailer chassis as claimed in claim 7, in which:
   (a) the horizontally extending flange of the bulkhead cross member has a downwardly extending margin portion, so that the bulkhead cross member has a generally Z-shaped section.

9. A truck trailer chassis as claimed in claim 5, in which:
   (a) the bunk means are located at stations coincident with the bulkhead cross members,
   (b) each bunk means has a pair of wing sections extending outwardly from the side walls of the beam member, each wing section having an inner face portion secured to an adjacent portion of the upper margin portions of the respective side wall.

10. A truck trailer chassis as claimed in claim 9, in which:
    (a) the wing sections have a generally closed rectangular cross-section having a pair of longitudinally spaced apart wing side walls, and vertically spaced apart wing top and bottom walls interconnecting the wing side walls, the wing top wall of each wing section being aligned with the top wall of the beam member, and one wing side wall of each wing section being aligned transversely with the respective bulkhead cross member.

11. A truck trailer chassis as claimed in claim 10, in which:
    (a) the bulkhead cross members have a lower portion which has a generally horizontally extending flange extending longitudinally of the chassis therefrom,
    (b) the wing bottom wall of the each wing section is aligned transversely with the horizontally extending flange of the bulkhead cross member.

12. A truck trailer chassis as claimed in claim 10, in which:
    (a) the inner face portion of each wing section has edges of the wing side walls inclined obliquely to the horizontal and disposed within a longitudinal plane so as to coincide with the inclination of the respective upper margin portion of the side wall to facilitate securing thereto.

13. A truck trailer chassis as claimed in claim 1 in which:
    (a) the lower flanges secured to the side wall portions are parallel sided elongated strips having central portions secured to downwardly facing lower edges of the lower margins of the sidewall portions.

14. A truck trailer chassis as claimed in claim 1, in which:
    (a) the top wall has a horizontal portion and the side walls have respective vertical portions,
    (b) the upper margin portions of the side wall portions are partially cylindrical elongated sheet portions which extend smoothly and tangentially between the vertical portions of the side wall and the horizontal portions of the top wall of the beam member.

15. A truck trailer chassis as claimed in claim 14, in which:
    (a) the flanges at the lower margins of the side walls extend smoothly inwardly from the vertical side walls to spaced apart inner edges, so that outer portions of the lower margins are free of obstruction.

16. A truck trailer comprising:
    (a) a chassis comprising an elongated beam member having a top wall portion and a pair of laterally spaced apart side wall portions, the side wall portions having respective upper margin portions which are inclined inwardly and upwardly to merge continuously with the top wall portion, the side wall portions having respective lower margin portions which have lower flanges to increase strength of the side wall portions, the flanges having inner edges which are spaced apart to provide a longitudinal gap therebetween, the longitudinal gap having a size to facilitate servicing of items located within an interior of the beam member,
    (b) the chassis further including a plurality of transversely extending bunk means spaced apart longitudinally along the beam member at respective stations,
    (c) internal transverse stiffening means for increasing stiffness of overall cross-section of the beam member, the stiffening means extending between at least two wall portions of the beam member and being spaced longitudinally apart at intervals along the beam member, (d) a rear wheel bogie mounted adjacent a rear end of the beam member, (e) support means for supporting a forward end of the chassis mounted adjacent the forward end of the beam member.

17. A truck trailer as claimed in claim 16, in which:
(a) the op wall has a horizontal portion and the side wall portions have respective vertical portions,
(b) the upper margin portions of the side wall portions are obliquely inclined elongated sheet portions which extend smoothly between the vertical portions of the side wall and the horizontal portion of the top wall of the beam member.

18. A truck trailer as claimed in claim 16, in which:
(a) the top wall has a horizontal portion and the side wall portions have respective vertical portions,
(b) the upper margin portions of the side wall portions are partially cylindrical elongated sheet portions which extend smoothly and tangentially between the vertical portions of the side wall and the horizontal portion of the top wall of the beam member.

19. A truck trailer as claimed in claim 16, in which the stiffening means comprises:
(a) a plurality of bulkhead cross members spaced apart longitudinally along the beam member at respective stations, each bulkhead cross member having an upper edge portion secured to a lower surface of the top wall of the beam member, and laterally spaced apart side edge portions secured to upper margin portions of the side walls of the beam member.

20. A truck trailer as claimed in claim 19, the stiffening means further including:
(a) a plurality of gusset members spaced apart longitudinally along the beam member at stations coincident with the respective bulkhead cross members, each gusset member having a top edge portion secured to the adjacent bulkhead cross member, and a side edge portion secured to an inner face of the side wall of the beam member.

21. A truck trailer chassis comprising:
(a) an elongated beam member having a top wall portion and a pair of laterally spaced apart side wall portions, the side wall portions having respective upper margin portions which are inclined inwardly and upwardly to merge continuously with the top wall portion, the side wall portions having respective lower margin portions which have respective flanges to increase strength of the side wall portions, the flanges having inner edges which are spaced apart to provide a longitudinal gap therebetween,
(b) a plurality of transversely extending bunk means spaced apart longitudinally along the beam member at respective stations,
(c) a plurality of bulkhead cross members spaced apart longitudinally along the beam member at respective stations, each bulkhead cross member having an upper edge portion secured to a lower surface of the top wall of the beam member, and laterally spaced apart side edge portions secured to upper margin portions of the side walls of the beam member.

22. A truck trailer chassis as claimed in claim 21, further including:
(a) a plurality of gusset members spaced apart longitudinally along the beam member at stations coincident with the respective bulkhead cross members, each gusset member having a top edge portion secured to the adjacent bulkhead cross member, and a side edge portion secured to an inner face of the side wall of the beam member.

23. A truck trailer chassis as claimed in claim 21, in which the bulkhead cross members have a lower portion which as a generally horizontally extending flange extending longitudinally of the chassis therefrom.

24. A truck trailer chassis as claimed in claim 23, in which:
(a) the horizontally extending flange of the bulkhead cross member has a downwardly extending margin portion, so that the bulkhead cross member has a generally Z-shaped section.

25. A truck trailer chassis as claimed in claim 21, in which:
(a) the bunk means are located at stations coincident with the bulkhead cross members,
(b) each bunk means has a pair of wing sections extending outwardly from the side walls of the beam member, each wing section having an inner face portion secured to an adjacent portion of the upper margin portions of the respective side wall.

26. A truck trailer chassis as claimed in claim 25, in which:
(a) the wing sections have a generally closed rectangular cross-section having a pair of longitudinally spaced apart wing side walls, and vertically spaced apart wing top and bottom walls interconnecting the wing side walls, the wing top wall of each wing section being aligned with the top wall of the beam member, and one wing side wall of each wing section being aligned transversely with the respective bulkhead cross member.

27. A truck trailer chassis as claimed in claim 26, in which:
(a) the bulkhead cross members have a lower portion which has a generally horizontally extending flange extending longitudinally of the chassis therefrom,
(b) the wing bottom wall of the each wing section is aligned transversely with the horizontally extending flange of the bulkhead cross member.

28. A truck trailer chassis as claimed in claim 26, in which:
(a) the inner face portion of each wing section has edges of the wing side walls inclined obliquely to the horizontal and disposed within a longitudinal plane so as to coincide with the inclination of the respective upper margin portion of the side wall to facilitate securing thereto.

29. A truck trailer comprising:
(a) a chassis comprising an elongated beam member having a top wall portion and a pair of laterally spaced apart side wall portions, the side wall portions having respective upper margin portions which are inclined inwardly and upwardly to merge continuously with the top wall portion, the side wall portions having respective lower margin portions which have lower flanges to increase strength of the side wall portions, the flanges having inner edges which are spaced apart to provide a longitudinal gap therebetween, (b) the chassis further including a plurality of transversely extending bunk means spaced apart longitudinally along the beam member at respective stations, (c) a plurality of bulkhead cross members spaced apart longitudinally along the beam member at respective stations, each bulkhead cross member having an upper edge portion secured to a lower surface of the top wall of the beam member, and laterally spaced apart side edge portions secured to upper margin portions of the side walls of the beam member, (d) a rear wheel bogie mounted adjacent a rear end of the beam member, (e) support means for supporting a forward end of the chassis mounted adjacent the forward end of the beam member.

30. A truck trailer as claimed in claim 29, in which:

(a) the top wall has a horizontal portion and the side wall portions have respective vertical portions, (b) the upper margin portions of the side wall portions are obliquely inclined elongated sheet portions which extend smoothly between the vertical portions of the side wall and the horizontal portion of the top wall of the beam member.

31. A truck trailer as claimed in claim 29, further including:

(a) a plurality of gusset members spaced apart longitudinally along the beam member at stations coincident with the respective bulkhead cross members, each gusset member having a top edge portion secured to the adjacent bulkhead cross member, and a side edge portion secured to an inner face of the side wall of the beam member.

* * * * *